United States Patent

Obermaier et al.

[15] 3,702,566
[45] Nov. 14, 1972

[54] HIGH AIR VELOCITY MEASURING SYSTEM HAVING THERMOTRANSDUCER

[72] Inventors: Alfred A. Obermaier, Barrington; Martin J. Pierman, Mount Prospect, both of Ill.

[73] Assignee: Alnor Instrument Company, Div. of Illinois Testing Laboratories, Inc., Chicago, Ill.

[22] Filed: Oct. 16, 1970

[21] Appl. No.: 81,371

Related U.S. Application Data

[60] Continuation-in-part of Ser. No. 78,563, Oct. 6, 1970, which is a division of Ser. No. 687,084, Nov. 13, 1967, abandoned.

[52] U.S. Cl. .................................. 73/204, 73/202
[51] Int. Cl. ........................... G01f 1/00, G01p 5/10
[58] Field of Search .................... 73/204, 202, 203

[56] References Cited

UNITED STATES PATENTS

| | | | |
|---|---|---|---|
| 3,159,998 | 12/1964 | Minter | 73/399 X |
| 1,681,762 | 8/1968 | Connet | 73/203 |
| 1,751,715 | 3/1930 | Peters, Jr. | 73/204 X |
| 1,766,149 | 6/1930 | Sawyer | 73/204 |
| 2,314,877 | 3/1943 | Hall | 73/204 |
| 2,591,195 | 4/1952 | Picciano | 73/204 |
| 2,594,618 | 4/1952 | Booth, Jr. | 73/204 |
| 3,559,482 | 2/1971 | Baker et al. | 73/204 |

FOREIGN PATENTS OR APPLICATIONS

| | | | |
|---|---|---|---|
| 25,923 | 4/1914 | Great Britain | 73/204 |

OTHER PUBLICATIONS

Pearson " Design of Hot Wire Anemometer" in Electronic Equipment Oct. 1954 pgs. 8 and 9
Flow Corporation Bulletin " Hot Film Sensor"

*Primary Examiner*—James J. Gill
*Assistant Examiner*—Herbert Goldstein
*Attorney*—Silverman & Cass

[57] ABSTRACT

The air flow is received into an air shunting probe having a pressure output, which is matched to the pressure output of a pitot tube and accurately tracks a pitot standard, by means of a specially designed high velocity "pitot probe" tip having a tapered passageway, a transverse gate, and a variable baffle therein. The thus received air flow is channeled through at least one and preferably two in-line valves, which limit the maximum air flow therethrough to a small fraction of that received by the probe. When two valves are employed they are piggyback mounted and the "rider" valve can be interchanged easily to thus change the range of operation of the system without need for any other changes, adjustments, or rescaling of an output recorder that is responsive to a thermocouple precisely positioned at the output side of the in-line valves. In this manner the voltage-air velocity curve traced by the output of the thermocouple is the same for all ranges of the system. A cantilever arrangement supports the hot junction of the thermocouple in such manner that it is immobile, despite changes in ambient temperature, the hot wire, air velocity and temperature at the hot junction, and thereby the hot junction remains in the same precise position with reference to air flow thereover.

38 Claims, 7 Drawing Figures

PATENTED NOV 14 1972
3,702,566
SHEET 1 OF 2
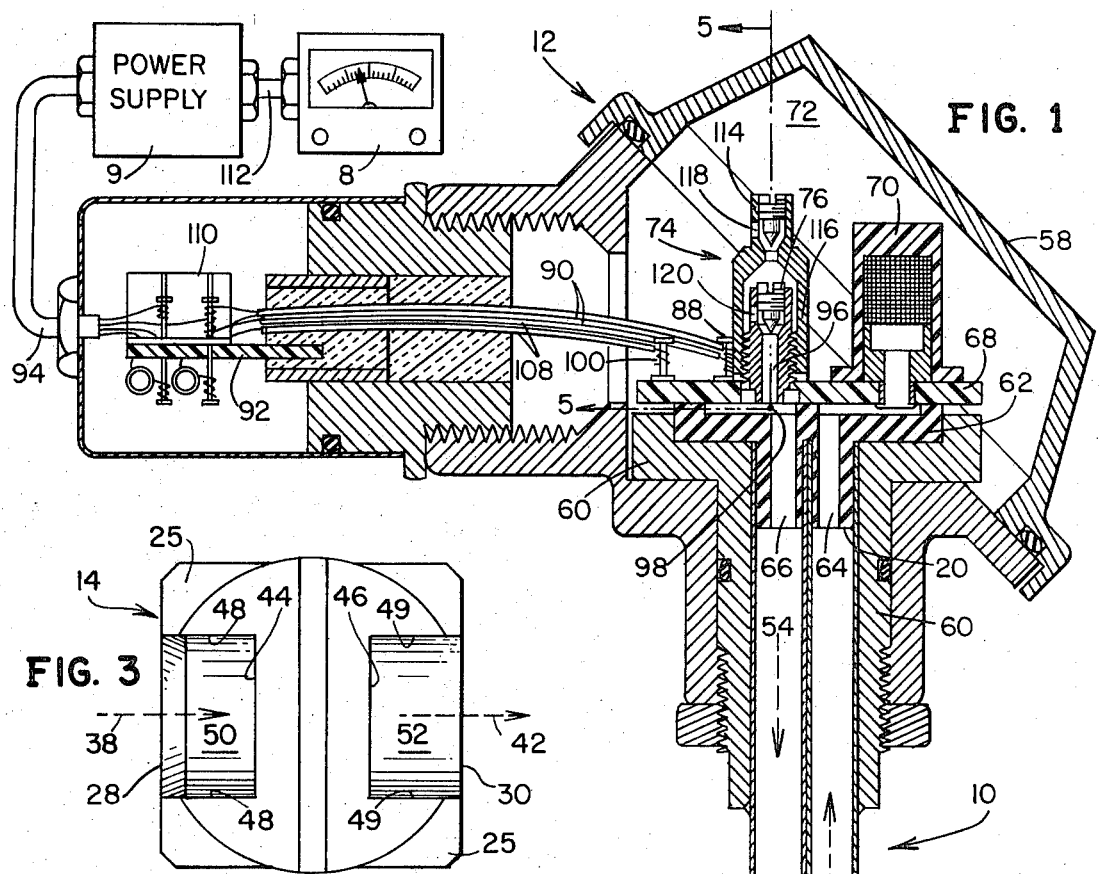
FIG. 1
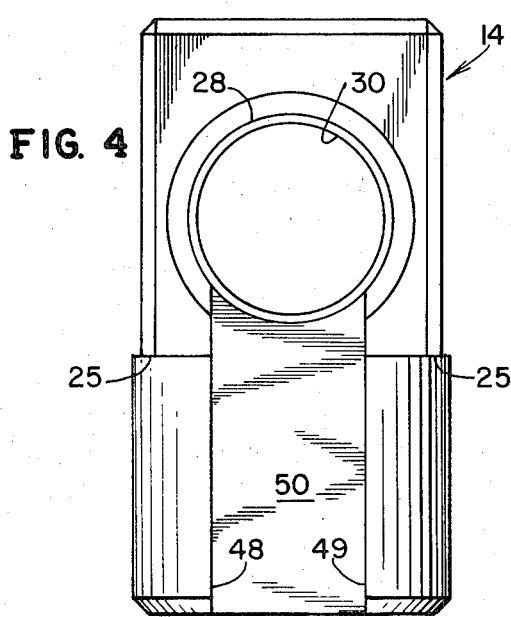
FIG. 3
FIG. 4
INVENTORS
ALFRED A. OBERMAIER
MARTIN J. PIERMAN.
BY
Silverman & Cass
ATTYS.

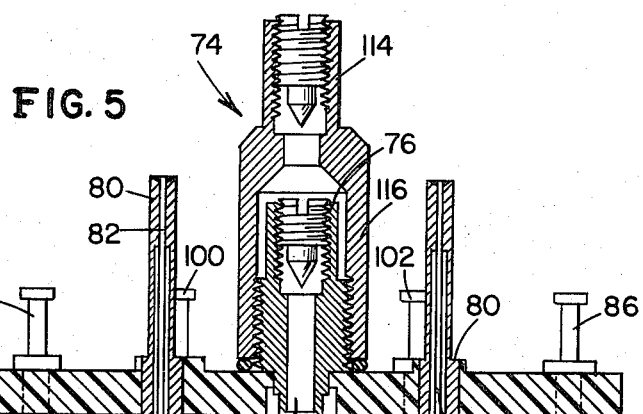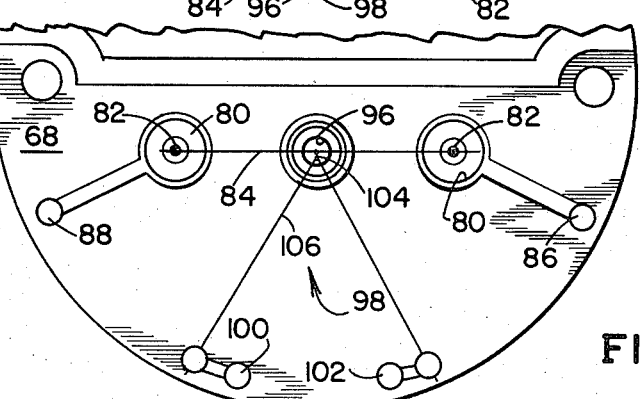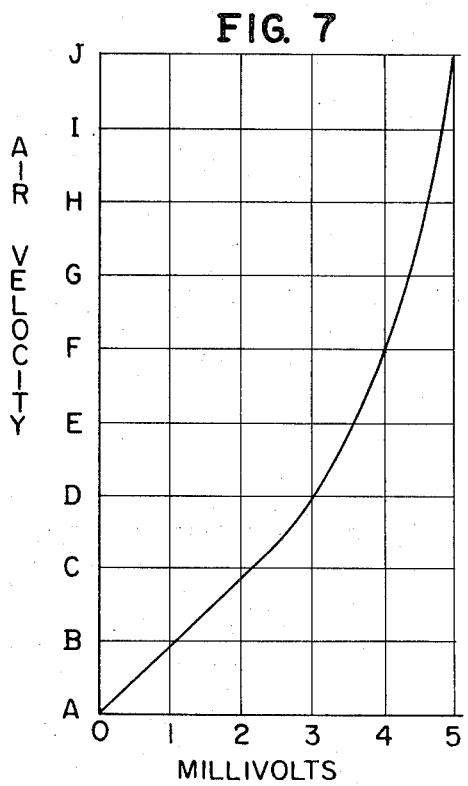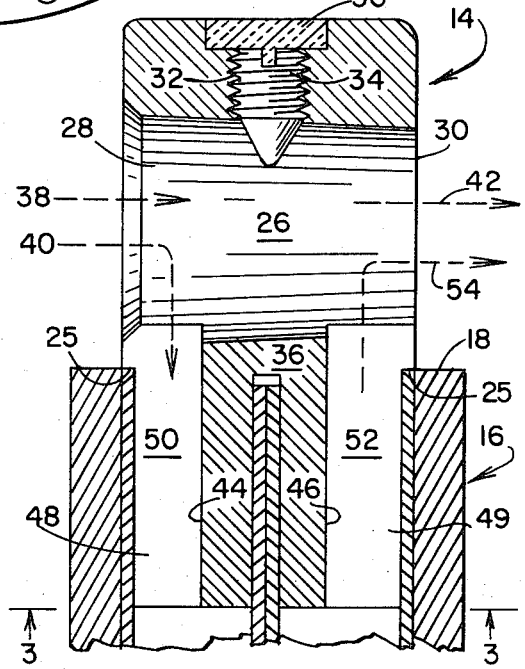

3,702,566

HIGH AIR VELOCITY MEASURING SYSTEM HAVING THERMOTRANSDUCER

CROSS REFERENCE TO RELATED APPLICATIONS

This is a Continuation-in-part of our copending application Ser. No. 78,563, filed on Oct. 6, 1970, entitled "Air Velocity Measuring System", which is a Division of our copending application Ser. No. 687,084, filed Nov. 13, 1967, entitled "Air Velocity Measuring System", now abandoned.

To the extent that it may become necessary, said copending applications are incorporated herein.

BACKGROUND OF THE INVENTION

This invention relates generally to an air velocity transducer system, e.g. a thermoanemometer having a thermotransducer for measuring high velocity air flow in the order of 20,000 feet per minute (100 meters per second) and, more specifically to a versatile thermoanemometer which will trace the same velocity-voltage output curve for each selected air velocity range; and the combination of embodiments of an improved thermotransducer with an air velocity probe that is uniquely designed to track a pitot standard and shield the thermocouple of the system from direct contact with the high velocity air flow.

Air velocity measuring systems are generally well known as a tool of heating, ventilating and air conditioning engineers and servicemen. Such measuring systems generally comprise an air flow meter, which has one or more accessories attached thereto. A typical air flow meter is shown in U.S. Pat. No. 2,690,671 to J.A. Obermaier et al, issued Oct. 5, 1954.

The prior art air velocity measuring systems require each specific accessory to be calibrated with a specific meter and an appropriate scale to be printed on the meter. Each accessory or combination of accessories, once calibrated with a particular meter, cannot be used with any other meter. If an accessory is lost, damaged, or destroyed, the meter must be returned to the factory to have a new accessory calibrated with the meter. Also, if a customer requires a duplicate or a new accessory, the meter must be returned so that such accessory can be calibrated with the meter. Each accessory has a serial number which is printed on the meter with which it was calibrated.

When a meter is returned to the factory to have a lost accessory replaced, the scale representing the calibration of the lost accessory must be removed from the meter and a new scale printed thereon representing the calibration of the new accessory. The attempt to change scale designations frequently results in the obliteration of adjacent valid scale data; accordingly, it is common practice to have all of the scales redrawn when the meter is returned for a single correction. Necesarily, each time the meter is sent to the factory, the customer loses the use of the meter, which further increases his operating expenses. To obviate this lost time, some customers have found it necessary to obtain a spare meter and set of accessories for the spare meter; thus, further increasing operating overhead.

The invention in the cited copending applications overcame the above described deficiencies in the prior art by providing a pitot calibrated system, having a shunting type probe adjustable to a pitot standard. One drawback to the design of the probe was that it limited the full scale air flow through the meter and also placed a response speed limit upon the otherwise superior performance of the system. Another limitation of the probe was that it did not track the pitot standard over a wide enough range of flow conditions.

Embodied in the cited copending applications is a system which combines a thermotransducer with the pitot calibrated probe in such an arrangement that the air flow first passed into the probe, was shunted in part, and the shunted part passed into a transducer housing having a low velocity calibrated needle valve interposed in-line just upstream of the thermocouple. Such embodiment, although quite useful, was subject to the limitations of the probe, as just above described, and also was subject to two additional drawbacks— lack of universal range versatility, and undesirable physical displacement of the hot junction with respect to the air flow stream thereover as temperature of the hot wire changed due to changes in the air velocity.

SUMMARY OF THE INVENTION

The air velocity measuring system made in accordance with this invention eliminates the problems and restrictions which are characteristic of prior art systems, including that of the copending applications as above described, and includes an improved thermotransducer having a cantilever-mounted hot wire and hot junction and an in-line valve arrangement, which is calibrated for modular exchange; whereby, a plurality of different air velocity ranges can be measured, with the transducer response to each range tracing the same voltage-velocity curve, so that a single output meter having only one scale common to all ranges can be employed. The thus improved thermotransducer is coupled to an air flow insertion probe having a tip and housing which are calibrated to match a pitot tube standard and track it over a wide range of air flow conditions, including velocities in the range of 20,000 feet per minute (100 meters per second). To differentiate this probe from other probes used in the prior art, we will refer to it as a "pitot probe."

The pitot probe housing comprises a conduit having a pair of parallel tubes, and the pitot probe tip comprises an air flow member having a tapered passageway lying transverse to one end of the conduit and suitable for insertion into and parallel with a moving air stream. A fixed baffle or gate and a variable baffle are positioned diametricaly opposite each other within the air flow member so as to protrude into the air stream. The variable baffle is coaxial with the conduit and is adjustable, so that a predetermined, pitot calibrated, portion of the air flowing into the passageway is channeled or shunted into one of the pair of tubes. The stem of the air flow member telescopes into the conduit and has a pair of longitudinal channel configurations which lead, respectively, into the parallel tubes of the conduit. The diameter at the input side of the passageway, and the height of the gate are significantly related. The cross section of the channels are sized to maximize the air flow into the thermotransducer. After the pitot probe has been calibrated initially so that the pressure of the air channeled into one of the pair of tubes matches the pressure reading of the pitot tube standard, it will always match the pressure read by the pitot tube standard, for any velocity of air. Hence, the pitot probe never has to be calibrated again and the variable baffle is sealed at the factory to prevent accidental change of its setting.

Accordingly, the principal object of this invention is to provide a pitot standarized, rapidly responding, air velocity measuring system having a precise and range versatile thermotransducer.

It is another object of this invention to provide a thermoaneomometer having an improved probe which accurately tracks a pitot tube standard over high air velocities.

It is a further object of this invention to provide an improved thermotransducer adapted to operate over several different air velocity ranges, while providing the same output response for each of the ranges.

It is a yet further object of this invention to provide a system which includes the just mentioned improved thermotransducer and improved probe in combination.

Many other objects of the subject invention, its combinations and subcombinations will occur to those skilled in this art, as a detailed description of a preferred embodiment is set forth in connection with the accompanying drawings.

BRIEF DESCRIPTION OF THE DRAWINGS

FIG. 1 is a schematic view of the subject system, including a longitudinal section through the improved combination of the thermotransducer and pitot probe;

FIG. 2 is an enlarged longitudinal sectional view through the improved pitot tip, seated in the probe as shown in FIG. 1;

FIG. 3 is a bottom plan view of the pitot probe tip, taken along line 3—3 in FIG. 2;

FIG. 4 is an enlarged side view of the pitot probe tip;

FIG. 5 is an enlarged longitudinal sectional view through the thermotransducer, taken along the line 5—5 in FIG. 1, showing the cantilever mounting for the hot wire and hot junction, and the inline valve means;

FIG. 6 is a bottom plan view of the circuit board on which is mounted the thermocouple and the cantilever arrangement; and FIG. 7 is a graph of the velocity-voltage curve traced by the output response of the thermoanemometer for several velocity ranges.

DESCRIPTION OF THE PREFERRED EMBODIMENT

Referring now to the drawings, FIG. 1 illustrates the major portions of the subject air velocity measuring system —a recording device 8, a power supply 9, a probe 10, and a thermotransducer 12 suitable for measuring the velocity of an air stream into which the tip 14 of the probe 10 is inserted.

The entire pitot probe 10, is illustrated in FIG. 1, and the improved pitot probe tip 14 is illustrated in detail in FIGs. 2–4. The probe comprises a conduit 16, having two ends 18 and 20. A pair of tubes 22 and 24 of D-shape cross section are longitudinally positioned within the conduit 16, such that their respective arcuate surfaces abut the interior wall of the conduit 16. It will be appreciated that the conduit and tubes also could be defined by a unitary structure and that the tubes may have other than the preferred D-shape cross section.

The pitot probe tip 14 is telescoped into the conduit end 18 and seats thereagainst via a segmented shoulder 25 which also acts as a calibration aid, as will be elaborated upon subsequently. A transverse, slightly tapered passageway 26 extends through the probe tip. The air input side 28 of the passageway 26 has a larger diameter than the static outlet side 30, and input side 28 is countersunk; whereas, the outlet side 30 is smooth.

A variable baffle, which comprises a threaded bore 32 and a needle screw 34, is positioned in the probe tip and extends partially into the passageway 26. A fixed baffle or gate 36 is positioned opposite the pointed end of the needle screw 34 so that an air stream, as represented by the arrow 38, entering the passageway 26 is partially channeled or shunted into the tube 22 as represented in FIGS. 1 and 2 by an arrow 40. The remaining part of the air stream, represented by an arrow 42, passes directly through the passageway 26.

As can be understood with reference to each of FIGS. 2–4, the top of the gate 36 is part of the wall of the passageway 26. Also, the portion of the probe tip below the passageway 26 is bifurcated by the gate 36 to define, in combination with longitudinal walls 44 and 46 of the gate and internal walls 48 and 49 of the probe tip, a pair of channels 50 and 52, having a relatively large cross section, capable of accepting all of the shunted air stream 40 and providing a static side return path for a returning air stream 54 from the thermotransducer 12, without acting as an air flow impedance.

A comparison of the pitot probe tip 14 with its counterpart air flow member in the cited copending applications will reveal that, although their generic configurations are similar, the larger size, tapered configuration, countersunk input and smooth output side, which define the passageway 26, all are significantly different from the structure which defines the counterpart passageway in the copending applications. Likewise, the gate 36, its size, rectangular shape, position relative to the passageway 26, and longitudinal sidewalls which cooperate in forming the large air channels 50 and 52, all are quite different from the fixed baffle in the copending applications. Not only do the above noted structural differences enable an increased flow of air into the probe tip to increase the volume of the air streams 40 and 54, thereby to enable this thermoanemometer to have a greatly increased full scale flow rate and to respond more rapidly, some of the structural improvements coact, in a manner heretofore unobvious, to greatly increase the accuracy of the pitot standard tracking of this improved probe tip.

The gate 36 and the variable baffle components 32, 34 are used in combination to calibrate the probe 10 to a pitot tube standard; also, most importantly as described hereinafter, the input side of the probe tip independently is sized to be calibrated to the pitot standard. The air stream 38 entering the passageway 26 has a total pressure which consists of a velocity pressure and a static pressure. The velocity pressure component 40 is, diverted into the tube 22 primarily by the gate 36; whereas, the variable baffle 34 is employed for fine adjustment of the air flow 40 into the tube 22, so that the velocity pressure of the channeled air stream 40 matches the pressure indicated by the pitot tube standard.

In order to calibrate the probe 10, it and a pitot tube standard are independently connected to the same duct to monitor the velocity pressure of an air stream having a substantially constant velocity. The pitot tube standard measures the differential pressure, which is equivalent to the velocity pressure of the air stream. After the pitot probe has been matched so that the pressure of the air channeled into tube 22 matches the pressure reading of the pitot tube standard, it will always match the pressure read by the pitot standard regardless of the velocity of the air stream.

Although the following calibration procedure refers to specific measurements, with relation to a full scale reading of 700 cc per minute, those skilled in the art will be able to adapt these teachings to the calibration of pitot probes for different full scale flow conditions and different construction parameters.

Initially, the passageway 26 is a circular cylinder having a diameter which is slightly smaller than 0.250 inch, such as 0.234 inch or 15/64 inches. The probe tip 14 is seated in the conduit 16 so that the axis of the passageway 26 lies 0.20 inch above the top end 18 of the conduit. The segmented shoulders 25 can provide this important orientation, which initially causes the gate 36 to protrude into the air stream 38 between 4/64 inches and 5/64 inches. The needle screw 34 is backed out of the bore until it does not project into the passageway 26. The reading of a standard pitot tube is set at 1.0 inch of water and both the pitot tube and the pitot probe 10 are positioned in a reference stream of air, with the static side of the probe not coupled to receive the return path air stream 54 into the bottom of the tube 24, and the output end 20 of the tube 22 on the inlet side of the probe is coupled to the total side of the measuring manometer.

With the above initial conditions, the output reading from the pitot probe should be between 0.1 inch and 0.3 inch of water, with the standard pitot tube reading being 1.0 inch of water. The next to be achieved goal is to cause their output ratios to come closer to a 1:10 ratio. This can be accomplished by reaming the passageway 26 with a long tapered reamer (about 15° taper) until the pitot probe output drops to 0.1 inch or just below. Care should be taken to cause the input side 28 of the probe tip to have the larger resulting diameter; hence, the reamer should be inserted from that side. As a consequence, the desired 1:10 ratio not only will be attained, but also a venturi configuration formed. Experience has shown that the passageway 26 will define a frustum, with the diameter at the input side 28 approaching 0.260 inch and the diameter at the static side 30 approaching 0.239 inch. Thus, the ratio of input side diameter to gate height into the flow stream 40 closely approximates 4:1.

The static tube 24 of the probe 10 then is coupled into the air flow return path and the output of the pitot probe will change to a value slightly less than the reading from the pitot tube standard. Thereupon, the needle screw 34 is turned to project into the passageway 26 until the output from the pitot probe matches that of pitot tube standard. At this juncture, the screw 34 is sealed in its position in the bore 32 by conventional sealant 56.

If the full scale flow is to be less than 700 cc per minute, the transverse passageway 26 can have a smaller pair of diameters and the height of the gate would be proportionately decreased, while at the same time maintaining the approximate 4:1 ratio. Nevertheless, the 1:10 ratio of pitot probe to pitot tube standard output, as above described, still would remain optimal for a wide range of tracking.

If the known use of this system was to be for low flow rates, the output ratio could be reduced toward 1:5 to gain further tracking accuracy. Conversely, an increased ratio, such as 1:20, would increase tracking accuracy for high flow rate use.

With reference again to FIG. 1 and then also to FIGS. 5 and 6, there is shown the thermotransducer 12 and its housing 58, which is coupled to the ends 20 of the tubes 22 and 24 of the conduit 16 by way of a tubular extension 60, into which the tubes 22 and 24 are received and are held by means not detailed, but which could be compression fittings, with O-rings, locknuts, etc. A dual air chamber gasket 62 fits into the conduit ends 20 and also seats into the interior end of the tubular extension 60 to define input and output passageways 64 and 66, into which flow, respectively, the shunted air stream 40 and the returning air stream 54.

A component mounting member 68, such as a printed circuit board, is secured (by means not shown) to the upper interior surface of the tubular extension 60. An air filter 70 is affixed to the member 68 for receiving and filtering the incoming air stream 40, which thereupon enters an accumulator area 72 within the housIng 58. The only air flow exit from the accumulation area 72 is by way of valve means 74, which directs that air flow into the Output passageway 66, so as to form thereby the return air stream 54.

In the cited copending applications, the valve means comprised a single valve, such as a needle valve 76, which was adjusted or tuned to limit the full scale air flow therethrough to a known relatively low value, such as 300 cc per minute. Downstream of the valve 76 was positioned a thermocouple element, over which Passed the return air stream. By well known relationships and arrangements, the hot junction of the thermocouple was cooled by the return air flow to an extent which was proportional to the return flow air velocity, and the change in temperature of the hot junction altered its resistance to electrical current therethrough, which change was calibrated in millivolts of current applied to a direct reading meter 8 or the like, calibrated in velocity of the input air stream 38.

One disadvantage in the thermotransducer of the copending applications was its undesirable reaction to temperature change due primarily to velocity change and to some extent the change in temperature of the ambient air flow. Since temperature change causes expansion and contraction of materials, the hot thermocouple junction moved per se and/or was translated by its supporting structure relative to the air stream flow; hence, the thermocouple was not precisely in the same position relative to the air flow at all times and, thus, was subject to a small amount of error in its response.

According to the preferred embodiment, as depicted in FIGS. 5 and 6, which are magnified several times, a pair of cantilever posts 80 are secured to and pass through the mounting member 68. Each post is hollow and is counter-bored through its lower position to a diameter such as 0.055 inch (1.40 millimeters). A spring tempered cantilever arm 82 is welded at its top to the top of each post 80 and passes therethrough so as to be laterally movable at its lower free end, to the limit set by the counterbore diameter. Stretched tightly across the free ends of the cantilever arms and secured thereto is a hot wire 84, which receives heating current by way of terminals 86 and 88 that are suitably connected by leads 90 to a circuit board 92 and a cable 94 to the Power supply 9. As shown, the hot wire passes over the center of the exit port 96 from the valve means 74. A thermocouple element 98 is mounted at its remote ends to electrical terminals 100 and 102, its hot junction 104 is welded to the hot wire 84 so that it also lies at the center of the exit port 96, and its cold junction 106 is positioned 0.219 inch (5.56 millimeters) from the hot junction 104.

Constructed in the just described manner, the cantilever arms 82 apply oppositely directed forces to the hot wire 84 and cause the hot junction 104 to be immobilized against dislocation due to: (1) velocity pressure changes in the air flowing thereover, (2) motion of the transducer housing, even if sudden enough to produce vibrations, and (3) thermal expansion and contraction of the hot wire. In the latter circumstance, as the hot wire lengthens or shortens due to its change in temperature, primarily because of velocity changes in the air stream 54, the cantilever arms 82 bow toward each other less or more, respectively, but at all times they apply equal and opposite forces upon the ends of the hot wire to thereby keep the hot junction in its same position. Experimentation has been able to produce a maximum of less than 0.001 inch (0.0254 millimeters) of movement of the thus mounted hot junction 104.

The resistance changes of the thermocouple, due to velocity Related temperature changes of the hot wire 84, are transmitted from the terminals 100 and 102 by leads 108 to the circuit board 92 and electronic components 110 thereon. From there the derived air velocity related electric signals are fed by way of the cables 94 and 112 to the recording device 8.

From the foregoing it now should be apparent that the cantilever mounting arrangement has use not only in its presently disclosed and improved thermotransducer environment and in combination with the subject improved pitot probe, but also can be employed in the thermotransducer disclosed in the cited copending applications and can be employed with other types of probes as well. Likewise, the next to be discussed improved in-line valve arrangement is not limited to a pitot probe combination or to a required combination with the cantilever mounting arrangement.

With reference to FIGS. 1, 5 and 7, the improved in-line valve means 74 basically comprises two valve elements 76 and 114, which can be of similar construction, such as needle valves, and are coupled in piggyback manner such that all of the returning air stream 54, which flows through the exit port 96, must also flow through both valve members 114 and 76 serially in that sequence. This especially simple mechanical arrangement provides a long sought for result of versatility of range selection which in no way causes the user to modify the output recorder 8, obtain scaling equipment, or even employ a multiscale recorder, as is necessary in the prior art.

As seen in FIGS. 1 and 5 the needle valve 114 has an elongated, internally threaded and depending body portion 116 which enables the valve 114 to be threaded upon external threads near the base of the valve 76, like an overcap. Any other air tight, yet easily demountable connecting means will be appropriate for joining these two valves in an in-line manner. Both valves are provided with input ports 118 and 120, respectively, which become increasingly blocked by the inward or downward movement of their needle screws, and the diameter of these ports aid in determining the tunable range of the valve —the larger the port, the lower the velocity range of its valve. Accordingly, the in-line valves define a series pair of air resistances; however, unlike electrical resistance elements connected in series, their total air resistance is not a simple arithmetic sum of their individual resistances. Nevertheless, their resistances are cumulative and capable of being a precise and reproducable total resistance measurement.

If, for example, the subject thermoanemometer was calibrated to operate over a velocity range of 200 to 2,000 feet per minute (1 to 10 meters per second), the valve 76 in the thermotransducer would be tuned or adjusted to pass a known full scale velocity, such as 300 cc per minute. Such adjustment is performed at the factory and then the needle valve screw is sealed into the valve body to prevent detuning of the instrument.

As well known in the art, the response of a thermotransducer will trace a characteristic voltage-velocity curve, such as that shown in FIG. 7. Also well known is the fact that if the valve 76 is recalibrated to operate over a different velocity range, its response curve will be sufficiently different from that shown in FIG. 7 such that a general purpose recording device could not be employed to receive both thermoactivated responses and reasonably report their velocity equivalents. Of course, recording meters can be built with a few switchable velocity ranges; however, not only are their systems limited to the use of these few predetermined velocity ranges, but such systems are significantly more expensive than if a simple, single response curve tracing recorder were employable.

Another alternative could be to replace the valve 75 with a valve which not only operated over a different range, but also was made to cause the thermotransducer to trace the same response curve as when the valve 76 was employed. Though possible, this is not a practical approach for a thermoanemometer owner to employ, because of the time required and the special equipment necessary to tune the system. Since the manufacturer of the thermoanemometer has the necessary equipment and its time is a marketable commodity, it could manufacture individual, custom made, replacement valves, assuming that at the time of such custom manufacture the system owner could return his entire system to the manufacturer for the calibration of the replacement valve in the whole system.

According to the present invention, the valve 76 is neither removed nor retuned, it remains in the original and factory sealed condition so as to pass 300 cc per minute at full scale velocity, for example. If, as in FIG. 7, this thermoanemometer has the full scale response range of 5 millivolts, such value is noted and then an uncalibrated valve, such as the valve 114, is mounted in-line with the valve 76, as shown in FIGS. 1 and 5. Thereupon, a newly desired full scale air velocity, such as 5,000 feet per minute (25 meters per second), is fed into the system, whereupon the nee-dle valve 114 is tuned or adjusted until the meter 8 shows a full scale reading of 5 millivolts. The system is thus calibrated to a new range of 500 to 5,000 feet per minute (2.5 to 25 meters per second) when the valve 114 is in-line, and continues to be calibrated to the 200 – 2,000 feet per minute range whenever the valve 114 is removed. In like manner the thermotransducer 12 can be calibrated easily to any range within the acceptance range of its input probe, such as the probe 10. For all ranges, the full scale response would be 5 millivolts and the full scale air flow into the port 96 would be 300 cc per minute; assuming these to be the basic parameters of the thermotransducer in question.

Stating it another way, the needle valve 114 is adjusted until the same 300 cc per minute flows over the thermocouple 98 for each new full scale range. The full scale air flow from the port 96 remaining constant for all velocity ranges permits an infinite number of piggyback or "rider" valves 114 to be provided for each thermotransducer.

Especially important is the fact that, when employed with the pitot probe 10, all of the subject thermotransducers 12 are interchangeable and all can be factory precalibrated to have the same basic range and thereby the same basic response curve. Hence, the factory can prepare a set of master "rider" valves 114 for various ranges and at any time quickly and cheaply provide a consumer with any valve 114 needed for any velocity range. Likewise, if a consumer needs a unique range defining valve 114, for which there is as yet no master, the factory can employ any one of its thermotransducers, having the same basic full scale valve (300 cc and 2,000 feet per minute), and easily prepare a new valve 114 to meet the unique range requirement.

It now should be appreciated that if the probe was not of the modular, interchangeable type, such as the pitot probe 10, then calibration of the system would require that the user's system be available to the manufacturer of the "rider" valves, or the manufacturer retain in some manner a calibration parameter record for each system and each probe sold, since each such system and probe would trace a different velocity-voltage response curve.

The graph of FIG. 7 is shown with its velocity scale unmarked, except for alphabetic designations A through J. If the full scale velocity at J was to be any one of 2,000; 3,000; 3,750; 4,500; 4,900; 5,000; 10,000; or 20,000 feet per minute, then the corresponding velocity-voltage values would be those on the next presented chart, and all would faithfully trace the same curve, that shown in FIG. 7.

|   | Velocity in Ft. per minute |   |   |   |   |   |   |   | mV. |
|---|---|---|---|---|---|---|---|---|---|
| A | 200 | 300 | 375 | 450 | 490 | 500 | 1000 | 2000 | 0.0 |
| B | 400 | 600 | 750 | 900 | 980 | 1000 | 2000 | 4000 | 1.1 |
| C | 600 | 900 | 1125 | 1350 | 1470 | 1500 | 3000 | 6000 | 2.15 |
| D | 800 | 1200 | 1500 | 1800 | 1960 | 2000 | 1000 | 8000 | 3.0 |
| E | 1000 | 1500 | 1875 | 2250 | 2450 | 2500 | 5000 | 10000 | 3.6 |
| F | 1200 | 1800 | 2250 | 2700 | 2940 | 3000 | 6000 | 12000 | 4.0 |
| G | 1400 | 2100 | 2625 | 3150 | 3430 | 3500 | 000 | 14000 | 4.35 |
| H | 1600 | 2400 | 3000 | 3600 | 3920 | 4000 | 8000 | 16000 | 4.6 |
| I | 1800 | 2700 | 3375 | 4050 | 4410 | 4500 | 9000 | 18000 | 4.8 |
| J | 2000 | 3000 | 3750 | 4500 | 4900 | 5000 | 10 | 20000 | 5.0 |

It is believed that the invention has been illustrated and described in sufficient detail for those skilled in the art to appreciate same and be able to practice its teachings even to the extent of incorporating variations and modifications lying within the spirit and scope of the invention.

What is sought to be secured by United States Letters Patent is:

1. A thermotransducer for a thermoanemometer which is to measure the velocity of an air stream comprising:

housing means for receiving at least a first portion of the air stream, thermocouple means having a hot wire and a hot junction, and a cantilever arrangement for supporting said hot wire and fixedly positioning a mid point segment thereof into the path of at least a velocity representative part of the air stream received in said housing means, said cantilever arrangement comprising a pair of cantilever arms equally and inwardly with said hot wire secured tautly therebetween and to remain so stressed to retain tension to said hot wire under operating conditions of said thermotransducer, said hot junction being joined to said midpoint segment of said hot wire and thereby also fixedly positioned relative to the representative part of the air stream which will flow thereover, whereby the fixed position of the hot junction is independent of temperature induced changes in the length of said hot wire.

2. A thermotransducer according to claim 1 in which said housing is provided with an air flow input and output and, in combination therewith, an air velocity probe constructed and arranged to be preadjusted to track a pitot standard and comprising a pair of longitudinally extending tubes, one end of each of said tubes being arranged to communicate air flow with said input and output, respectively, a probe tip for connection to the other end of said tubes and designed to define an air flow input side and a static side for input and output air flow communication with said tubes, respectively, a passageway through said probe tip transverse to said tubes and opening for communication therewith, for insertion parallel to the air stream which is to be measured, and preadjustable air flow shunting and control means disposed within and transverse to said passageway for shunting said first portion of the air stream into said thermotransducer and for controlling the amount of air which goes through said passageway in a manner which can be preadjusted to track a pitot standard.

3. A thermotransducer and air velocity probe according to claim 2 in which said shunting and control means comprise a variable height baffle projecting into said passageway and operable as a valve, and a fixed height baffle lying opposite from said variable height baffle and positioned along the axis of said passageway so as to separate said input side from said static side and act to shunt the first portion of the air flow stream into the said input of said housing.

4. A thermotransducer and air velocity probe according to claim 3 in which
said passageway is defined by a smooth and continuous bore,
said fixed height baffle is a gate having longitudinal side walls depending from said passageway and spaced apart by a distance significantly less than the axial length of said bore,
an uppermost portion of said gate is defined by the upper ends of said side walls and said bore,
said probe tip has longitudinal internal walls which, in combination with said side walls, define a pair of air channels, which depend from said passageway, one on each side of said gate, and
said channels have respective input and output ends, with the input end of one of said channels and the output end of the other of said channels being adjacent said passageway, and
said other end of each of said longitudinal tubes of said probe separately encompassing the output end of said one channel and the input end of said other channel, and having a top end which terminates a significant distance below said uppermost portion of said gate.

5. A thermotransducer and air velocity probe according to claim 4 in which
the diameter of said passageway and said distance between the top of said other end of said tubes and the uppermost portion of said gate are specifically dimensioned and combine to define a coactive relationship which determines, in part, the amount of shunted air stream and enhances the tracking of said probe to a pitot standard.

6. A thermotransducer and air velocity probe according to claim 5 in which
said coactive relationship approximates a ratio of 4:1 between the diameter of said passageway and said distance between the ends of said tubes and the uppermost portion of said gate.

7. A thermotransducer and air velocity probe according to claim 4 in which
said passageway is tapered, with its diameter proximate the input end of said one channel being larger than its diameter proximate the output end of said other channel.

8. A thermotransducer and air velocity probe according to claim 4 in which
said probe tip and said longitudinal tubes are separable and constructed for interconnection and
at least one of said probe tip and tube ends includes structure for maintaining said distance between the ends of said tubes and the uppermost portion of said gate.

9. A thermotransducer for a thermoanemometer which is to measure the velocity of an air stream comprising:
housing means for receiving at least a first portion of the air stream,
thermocouple means having a hot wire and a hot junction, and
a cantilever arrangement for supporting said hot wire and fixedly positioning a mid point segment thereof into the path of at least a velocity representative part of the air stream received in said housing means,
said hot junction being joined to said mid point segment of said hot wire and thereby also fixedly positioned relative to the representative part of the air stream which will flow thereover, whereby the fixed position of the hot junction is independent of temperature induced changes in the length of said hot wire;
valve means mounted upstream of said hot junction for receiving at least the representative part of the air stream and comprising
a pair of valves, a first of said valves being tuned to define a basic, maximum air flow quantum through said thermotransducer for a predetermined maximum air flow velocity for the air stream which is to be measured,
both said valves, in combination, being tuned also to define said basic, maximum air flow quantum through said thermotransducer, but for a different and higher valued, predetermined maximum air flow velocity for the air stream to be measured,
a second of said valves being constructed for easy combination with and dissociation from use with said first valve, for defining two different air flow velocity ranges for said thermotransducer and
the thermoresponse of said thermocouple being the same over both said velocity ranges;
said housing being provided with an air flow input and output and, in combination therewith,
an air velocity probe constructed and arranged to be preadjusted to track a pitot standard and comprising
a pair of longitudinally extending tubes,
one end of each of said tubes being arranged to communicate air flow with said input and output, respectively,
a probe tip for connection to the other end of said tubes and designed to define an air flow input side and a static side for input and output air flow communication with said tubes, respectively,
a passageway through said probe tip transverse to said tubes and opening for communication therewith, for insertion parallel to the air stream which is to be measured, and
preadjustable air flow shunting and control means disposed within and transverse to said passageway for shunting said first portion of the air stream into said thermotransducer and for controlling the amount of air which goes through said passageway in a manner which can be preadjusted to track a pitot standard.

10. A thermotransducer according to claim 9 in which said cantilever arrangement comprises
a pair of cantilever arms between which said hot wire is secured tautly,
said pair of cantilever arms being prestressed equally and inwardly so as to retain tension to said hot wire under operating conditions of said thermotransducer.

11. A thermotransducer according to claim 9 in which
said first and second valves are constructed for the mounting of one on to the other in an in-line manner.

12. A thermotransducer and air velocity probe according to claim 9 in which said shunting and control means comprise
   a variable height baffle projecting into said passageway and operable as a valve, and
   a fixed height baffle lying opposite from said variable height baffle and positioned along the axis of said passageway so as to separate said input side from said static side and act to shunt the first portion of the air flow stream into the said input of said housing.

13. A thermotransducer and air velocity probe according to claim 12 in which
   said passageway is defined by a smooth and continuous bore,
   said fixed height baffle is a gate having longitudinal side walls depending from said passageway and spaced apart by a distance significantly less than the axial length of said bore,
   an uppermost portion of said gate is defined by the upper ends of said side walls and said bore,
   said probe tip has longitudinal internal walls which, in combination with said side walls, define a pair of air channels, which depend from said passageway, one on each side of said gate, and
   said channels have respective input and output ends, with the input end of one of said channels and the output end of the other of said channels being adjacent said passageway, and
   said other end of each of said longitudinal tubes of said probe separately encompassing the output end of said one channel and the input end of said other channel, and having a top end which terminates a significant distance below said uppermost portion of said gate.

14. A thermotransducer and air velocity probe according to claim 13 in which
   the diameter of said passageway and said distance between the top and said other end of said tubes and the uppermost portion of said gate are specifically dimensioned and combine to define a coactive relationship which determines, in part, the amount of shunted air stream and enhances the tracking of said probe to a pitot standard.

15. A thermotransducer and air velocity probe according to claim 14 in which
   said coactive relationship approximates a ratio of 4:1 between the diameter of said passageway and said distance between the ends of said tubes and the uppermost portion of said gate.

16. A thermotransducer and air velocity probe according to claim 13 in which
   said passageway is tapered, with its diameter proximate the input end of said one channel being larger than its diameter proximate the output end of said other channel.

17. A thermotransducer and air velocity probe according to claim 13 in which
   said probe tip and said longitudinal tubes are separable and constructed for interconnection and
   at least one of said probe tip and tube ends includes structure for maintaining said distance between the ends of said tubes and the uppermost portion of said gate.

18. A thermotransducer for a thermoanemometer which is to measure the velocity of an air stream comprising:
   housing means for receiving at least a first portion of the air stream,
   a thermocouple having a hot wire and a hot junction mounted in said housing means, and
   valve means mounted upstream of said hot junction for receiving at least the first portion of the air stream and comprising
   a pair of valves,
   a first of said valves being tuned to define a basic, maximum air flow quantum through said thermotransducer for a predetermined maximum air flow velocity for the air stream which is to be measured,
   both said valves, in combination, being tuned also to define said basic, maximum air flow quantum through said thermotransducer, but for a different and higher valued predetermined maximum air flow velocity for the air stream to be measured,
   a second of said valves being constructed for easy combination with and dissociation from use with said first valve, for defining two different air flow velocity ranges for said thermotransducer
   the thermoresponse of said thermocouple being the same over both said velocity ranges,
   the said construction of said second valve provides coupling means, and
   a mating construction on said first valve is provided,
   whereby said second valve can be coupled in-line to said first valve with ease when the higher valued air velocity is to be measured.

19. A thermotransducer according to claim 18 in which
   air stream channeling means is provided in said housing upstream of said hot junction and forms a flow path of small cross section for a velocity representative part of the air stream and
   said hot junction is positioned in the axial center of said flow path.

20. A thermotransducer according to claim 19 in which
   said valve means defines said channeling means and
   said hot junction is fixedly positioned with respect to the output side of said valve means.

21. A thermotransducer according to claim 18 further comprising
   a hot wire for the thermocouple,
   a cantilever arrangement for supporting said hot wire and fixedly positioning at least a segment thereof into the path of at least a velocity representative part of the air stream received in said housing means,
   said hot junction being joined to said segment of said hot wire and thereby also fixedly positioned relative to the representative part of the air stream which will flow thereover,
   whereby the fixed position of the hot junction is made independent of temperature induced changes in the length of said hot wire.

22. A thermotransducer according to claim 21 in which said cantilever arrangement comprises
   a pair of cantilever arms between which said hot wire is secured tautly.

23. A thermotransducer according to claim 18 in which
   said housing is provided with an air flow input and output and, in combination therewith, an air velocity probe constructed and arranged to be preadjusted to track a pitot standard and comprising a pair of longitudinally extending tubes, one end of each of said tubes being arranged to communicate air flow with said input and output, respectively, a probe tip for connection to the other end of said tubes and designed to define an air flow input side and a static side for input and output air flow communication with said tubes, respectively, a passageway through said probe tip transverse to said tubes and opening for communication therewith, for insertion parallel to the air stream which is to be measured, and preadjustable air flow shunting and control means disposed within and transverse to said passageway for shunting said first portion of the air stream into said thermotransducer and for controlling the amount of air which goes through said passageway in a manner which can be preadjusted to track a pitot standard.

24. A thermotransducer and air velocity probe according to claim 23 in which said shunting and control means comprise a variable height baffle projecting into said passageway and operable as a valve, and a fixed height baffle lying opposite from said variable height baffle and positioned along the axis of said passageway so as to separate said input side from said static side and act to shunt the first portion of the air flow stream into the said input of said housing.

25. A thermotransducer and air velocity probe according to claim 24 in which said passageway is defined by a smooth and continuous bore, said fixed height baffle is a gate having longitudinal side walls depending from said passageway and spaced apart by a distance significantly less than the axial length of said bore, an uppermost portion of said gate is defined by the upper ends of said side walls and said bore, said probe tip has longitudinal internal walls which, in combination with said side walls, define a pair of air channels, which depend from said passageway, one on each side of said gate, and said channels have respective input and output ends, with the input end of one of said channels and the output end of the other of said channels being adjacent said passageway, and said other end of each of said longitudinal tubes of said probe separately encompassing the output end of said one channel and the input end of said other channel, and having a top end which terminates a significant distance below said uppermost portion of said gate.

26. A thermotransducer and air velocity probe according to claim 25 in which the diameter of said passageway and said distance between the top of said other end of said tubes and the uppermost portion of said gate are specifically dimensioned and combine to define a coactive relationship with determines, in part, the amount of shunted air stream and enhances the tracking of said probe to a pitot standard.

27. A thermotransducer and air velocity probe according to claim 26 in which said coactive relationship approximates a ratio of 4:1 between the diameter of said passageway and said distance between the ends of said tubes and the uppermost portion of said gate.

28. A thermotransducer and air velocity probe according to claim 25 in which said passageway is tapered, with its diameter proximate the input end of said one channel being larger than its diameter proximate the output end of said other channel.

29. A thermotransducer and air velocity probe according to claim 25 in which said probe tip and said longitudinal tubes are separable and constructed for interconnection and at least one of said probe tip and tube ends includes structure for maintaining said distance between the ends of said tubes and the uppermost portion of said gate.

30. A method for tuning a thermotransducer according to claim 18 comprising the steps of:

passing at least a representative part of said predetermined maximum air flow velocity through said thermotransducer with only said first valve mounted upstream of said hot junction, recording the thermoresponse of said thermocouple, placing said second valve into combination with said first valve, passing at least a representative part of said higher valued maximum air flow velocity through said thermotransducer, tuning only said second valve until the thermoresponse of said thermocouple is the same, considering any proportionality between said representative parts, as that which was recorded in the absence of said second valve.

31. An air velocity measuring system comprising:

an air velocity probe arranged to track a pitot standard, said probe including a probe tip constructed for insertion orthogonally into an air stream, a smooth and continuous bore passing through said probe tip defining a transverse passageway through said probe tip for parallel orientation with the air stream, an air shunting gate lying normal to said passageway near its midpoint and having longitudinal side walls depending from said passageway, lying transverse to the axis of said bore, and spaced apart by a distance significantly less than the axial length of said bore, an uppermost portion of said gate being defined by the upper ends of said side walls and said smooth bore, said probe tip having longitudinal internal walls which, in combination with said side walls, define a pair of air channels, which depend from said passageway, one on each side of said gate, said channels having respective input and output ends, with the input end of one of said channels and the output end of the other of said channels being adjacent said passageway, said passageway being tapered, with its diameter proximate the input end of said one channel being larger than its diameter proximate the output end of said other channel, air flow conduit means constructed to receive the air flow through each of said channel separately, to encompass the output end of said one channel and the input end of said other channel, and having a top end which terminates a significant distance below said uppermost portion of said gate, and a variable height baffle mounted in said probe tip and projectable into said passageway for regulating the amount of the air stream flowing therethrough with respect to the amount of the air stream shunted by said shunting gate into the input end of said one channel; and a thermotransducer for measuring the velocity of the air stream said thermotransducer including housing means for receiving from said one channel the shunted portion of the air stream, thermocouple means having a hot wire and a hot junction, an arrangement for positioning said thermocouple means into the path of a velocity representative part of the shunted portion of the air stream received in said housing means, and valve means mounted upstream of said hot junction for receiving the shunted portion of the air stream, said valve means being tuned to define a basic, maximum air flow quantum through said thermotransducer for a predetermined maximum air flow velocity for the air stream which is to be measured.

32. An air velocity measuring system according to claim 31 in which the diameter of said passageway and said distance between the top of said conduit means and the uppermost portion of said gate combine to define a coactive relationship which determines, in part, the amount of shunted air stream and enhances the tracking of said probe to a pitot standard, said coactive relationship approximating a ratio of 4:1 between the diameter of said passageway and said distance between the top of said conduit means and the uppermost portion of said gate.

33. An air velocity measuring system according to claim 31 in which said probe tip and said conduit means are separable and constructed for interconnection and at least one of said probe tip and conduit means includes structure for maintaining said distance between the top of said conduit means and the uppermost portion of said gate.

34. An air velocity measuring system according to claim 31 in which said positioning arrangement includes cantilever means for supporting said hot wire and fixedly positioning at least a segment thereof into the velocity representative part of the air stream, said cantilever arrangement comprising a pair of cantilever arms prestressed equally and inwardly with said hot wire secured tautly therebetween so as to retain tension to said hot wire under operating conditions of said thermotransducer, said hot junction being joined to said segment of said hot wire and thereby also fixedly positioned relative to the velocity representative part of the air stream which will flow thereover, whereby the fixed position of the hot junction is independent of temperature induced changes in the length of said hot wire.

35. An air velocity measuring system according to claim 31 in which said valve means includes a pair of valves, a first of said valves being tuned to define said basic, maximum air flow quantum through said thermotransducer, both said valves, in combination, being tuned also to define said basic, maximum air flow quantum through said thermotransducer, but for a different and higher valued, predetermined maximum air flow velocity for the air stream to be measured, a second of said valves being constructed for easy combination with and dissociation from use with said first valve, for defining two different air flow velocity ranges for said thermotransducer and the thermoresponse of said thermocouple being the same over both said velocity ranges.

36. An air velocity measuring system according to claim 35 which further comprises electrical means for energizing said thermocouple and deriving therefrom a velocity calibrated response.

37. An air velocity measuring system according to claim 36 in which said electrical means includes a velocity recording device having only one input to output response characteristic.

38. A method for tuning an air velocity measuring system according to claim 37 comprising the steps of:

passing at least a representative part of said predetermined maximum air flow velocity through said thermotransducer, with only said first valve mounted upstream of said hot junction, recording the thermoresponse of said thermocouple, placing said second valve into combination with said first valve, passing at least a representative part of said higher valued maximum air flow velocity through said thermotransducer, tuning only said second valve until the thermoresponse of said thermocouple is the same, considering any proportionality between said representative parts, as that which was recorded in the absence of said second valve.

* * * * *

PO-1050
(5/69)

UNITED STATES PATENT OFFICE
CERTIFICATE OF CORRECTION

Patent No. 3,702,566          Dated November 14, 1972

Inventor(s) Alfred A. Obermaier, et al.

It is certified that error appears in the above-identified patent and that said Letters Patent are hereby corrected as shown below:

Column 8, line 45, change "75" to --76--. Column 9, in the chart commencing on line 60, the 7th column of Nos. therein: line D, change "1000" to --4000--; line G, change "000" to --7000--; line J, change "10" to --10,000--. Column 10, line 22, after "arms" insert --stressed--. Column 15, line 64, change "with" to --which--.

Signed and sealed this 29th day of May 1973.

(SEAL)
Attest:

EDWARD M. FLETCHER, JR.          ROBERT GOTTSCHALK
Attesting Officer          Commissioner of Patents